(12) United States Patent
Jenne et al.

(10) Patent No.: US 9,710,179 B2
(45) Date of Patent: Jul. 18, 2017

(54) SYSTEMS AND METHODS FOR PERSISTENT MEMORY TIMING CHARACTERIZATION

(71) Applicant: Dell Products L.P., Round Rock, TX (US)

(72) Inventors: John Erven Jenne, Austin, TX (US); Stuart Berke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/829,314

(22) Filed: Aug. 18, 2015

(65) Prior Publication Data

US 2017/0052716 A1     Feb. 23, 2017

(51) Int. Cl.
*G06F 1/26* (2006.01)
*G06F 3/06* (2006.01)
*G06F 1/32* (2006.01)

(52) U.S. Cl.
CPC .......... *G06F 3/0619* (2013.01); *G06F 1/3206* (2013.01); *G06F 3/0604* (2013.01); *G06F 3/0647* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 2007/0097569 A1* | 5/2007 | Huang | H02M 1/32 361/56 |
| 2008/0005474 A1* | 1/2008 | Long | G06F 11/1441 711/118 |
| 2009/0031072 A1* | 1/2009 | Sartore | G06F 12/0638 711/102 |
| 2013/0097458 A1* | 4/2013 | Sekino | G06F 11/1441 714/6.3 |

\* cited by examiner

*Primary Examiner* — Paul Yanchus, III
(74) *Attorney, Agent, or Firm* — Jackson Walker L.L.P.

(57) ABSTRACT

In accordance with embodiments of the present disclosure, an information handling system may include a processor and a management controller communicatively coupled to the processor and configured to, during boot of the information handling system determine a first amount of energy required by the information handling system to perform a save operation to transfer data from a volatile memory to a non-volatile memory of a persistent memory in response to a loss of power for supplying electrical energy to the information handling system, determine whether a second amount of energy available for providing electrical energy for the save operation in response to the loss of power exceeds the first amount of energy, and responsive to determining whether the second amount of energy exceeds the first amount of energy, determine whether to support the persistent memory.

15 Claims, 2 Drawing Sheets

SYSTEMS AND METHODS FOR PERSISTENT MEMORY TIMING CHARACTERIZATION

TECHNICAL FIELD

The present disclosure relates in general to information handling systems, and more particularly to systems and methods for providing real-time persistent memory save measurements in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are increasingly using persistent memory technologies such as Non-Volatile Dual In-line Memory Modules (NVDIMMs). An NVDIMM is a memory module that may retain data even when electrical power is removed either from an unexpected power loss, system crash or from a normal system shutdown. To enable such functionality, an NVDIMM may include a traditional dynamic random access memory (DRAM) which may store data during normal operation when electrical power is available from a power supply unit and a flash memory to back up data present in the DRAM when a loss of electrical power from the power supply unit occurs. A battery, capacitor, or other energy storage device either internal or external to the NVDIMM may supply electrical energy for a "save" operation to transfer data from the DRAM to the flash memory in response to a power loss event from the power supply unit.

NVDIMMs may require tens of seconds to minutes of time to copy from DRAM memory to flash memory. Such time may vary with NVDIMM capacity, organization, supplier, error correction code modes, encryption settings, or state-of-wear leveling. Designing an energy storage device to support worse case timing across all NVDIMM configurations may be impractical or cost-ineffective.

SUMMARY

In accordance with the teachings of the present disclosure, the disadvantages and problems associated with existing approaches to characterizing timing in a persistent memory of an information handling system may be reduced or eliminated.

In accordance with embodiments of the present disclosure, an information handling system may include a processor and a management controller communicatively coupled to the processor and configured to, during boot of the information handling system determine a first amount of energy required by the information handling system to perform a save operation to transfer data from a volatile memory to a non-volatile memory of a persistent memory in response to a loss of power for supplying electrical energy to the information handling system, determine whether a second amount of energy available for providing electrical energy for the save operation in response to the loss of power exceeds the first amount of energy, and responsive to determining whether the second amount of energy exceeds the first amount of energy, determine whether to support the persistent memory.

In accordance with these and other embodiments of the present disclosure, a method may include, during boot of an information handling system, determining a first amount of energy required by the information handling system to perform a save operation to transfer data from a volatile memory to a non-volatile memory of a persistent memory in response to a loss of power of one or more power supplies for supplying electrical energy to the information handling system, determining whether a second amount of energy available for providing electrical energy for the save operation in response to the loss of power exceeds the first amount of energy, and responsive to determining whether the second amount of energy exceeds the first amount of energy, determining whether to support the persistent memory.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, during boot of an information handling system, determine a first amount of energy required by the information handling system to perform a save operation to transfer data from a volatile memory to a non-volatile memory of a persistent memory in response to a loss of power of one or more power supplies for supplying electrical energy to the information handling system, determine whether a second amount of energy available for providing electrical energy for the save operation in response to the loss of power exceeds the first amount of energy, and responsive to determining whether the second amount of energy exceeds the first amount of energy, determine whether to support the persistent memory.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
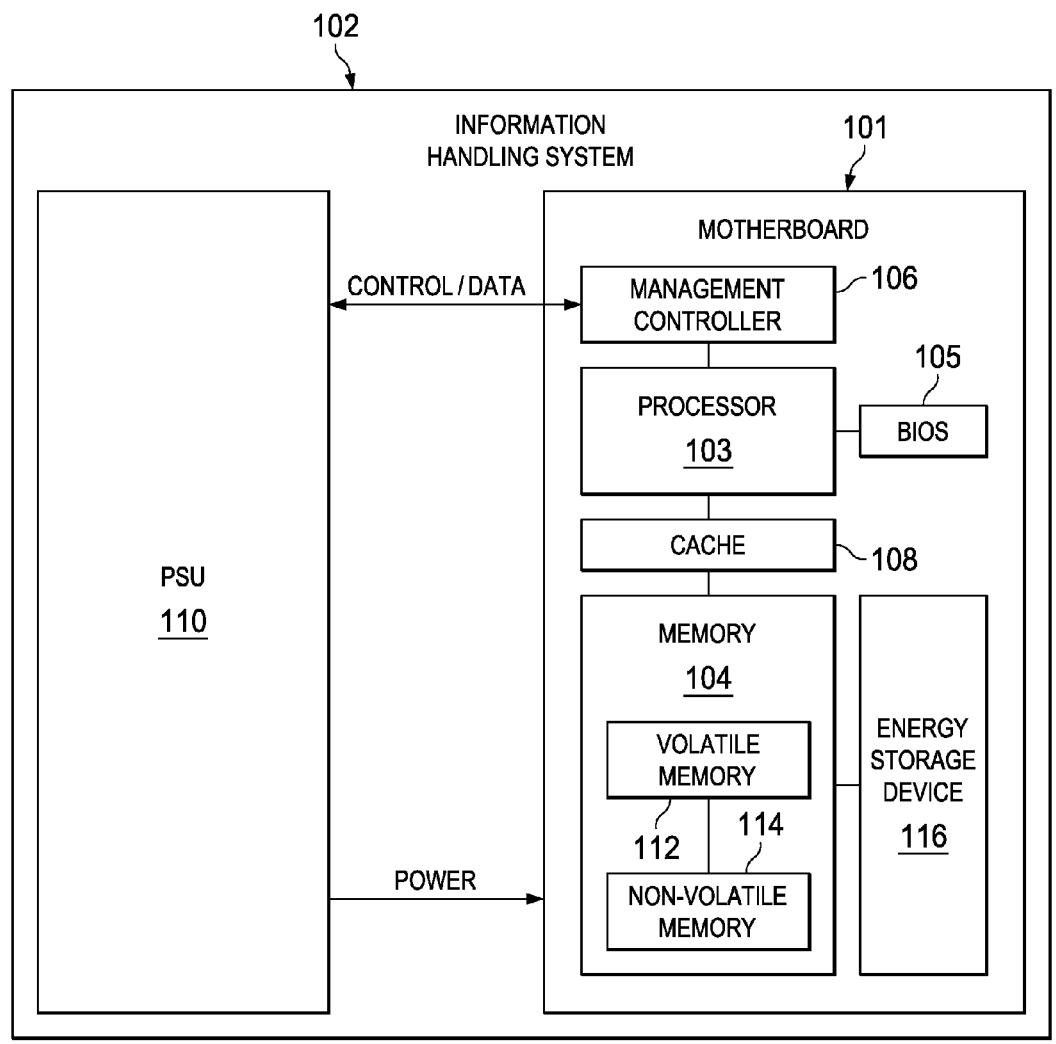
FIG. 1 illustrates a block diagram of an example information handling system, in accordance with embodiments of the present disclosure.
Figure 2:
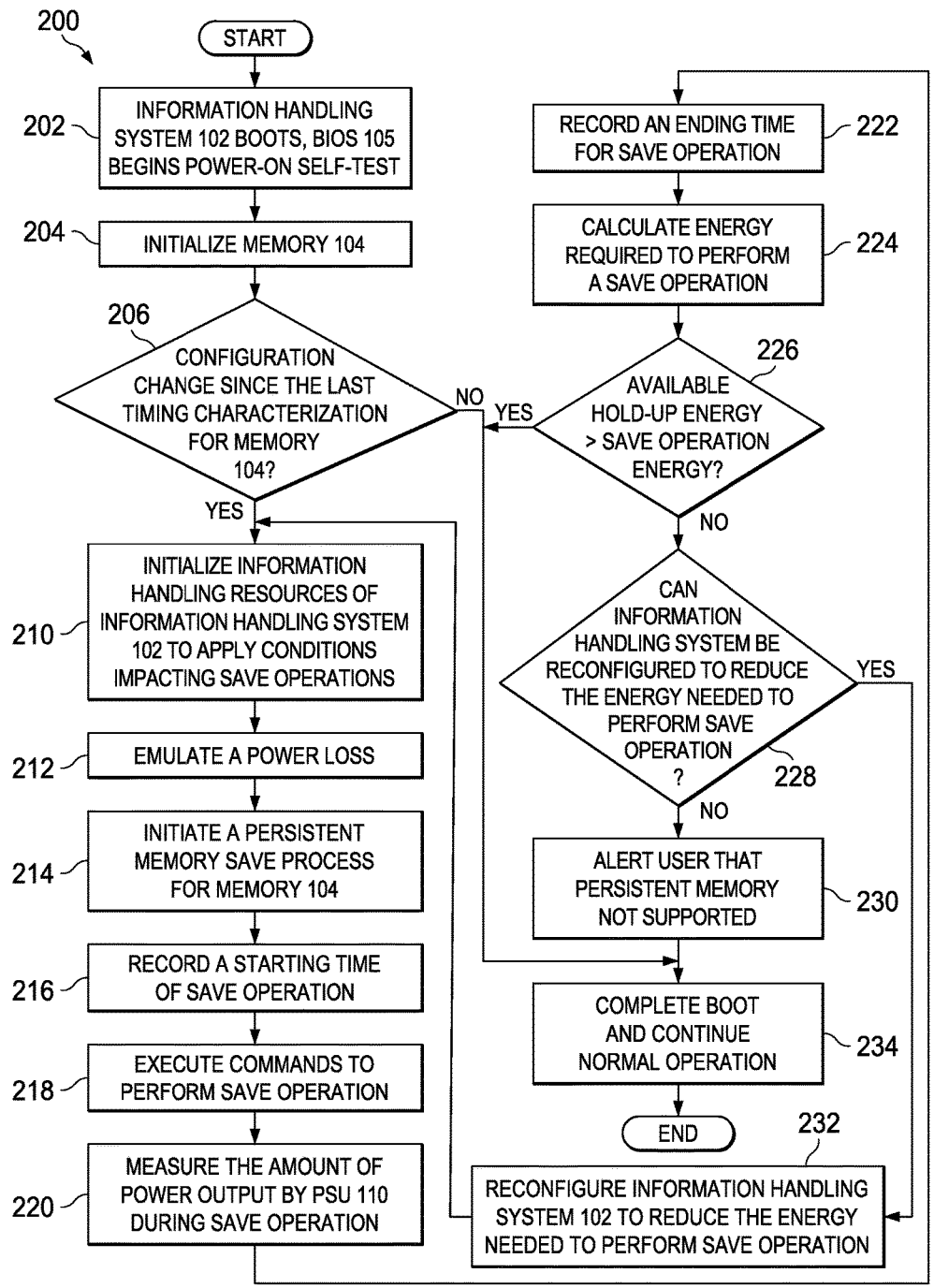
FIG. 2 illustrates a flow chart of an example method for timing characterization of a non-volatile memory, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 102. As depicted, information handling system 102 may include a power supply unit (PSU) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a BIOS 105, a management controller 106, a processor cache 108, an energy storage device 116, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. As shown in FIG. 1, memory 104 may comprise a persistent memory (e.g., comprising one or more NVDIMMs) that includes a volatile memory 112 (e.g., DRAM or other volatile random-access memory) and non-volatile memory 114 (e.g., flash memory or other non-volatile memory). During normal operation, when PSU 110 provides adequate power to components of information handling system 102, data written to memory 104 from processor 103 and/or cache 108 may be stored in volatile memory 112. However, in the event of loss of system input power or a power fault of PSU 110 that prevents delivery of electrical energy from PSU 110 to memory 104, data stored in volatile memory 112 may be transferred to non-volatile memory 114 in a save operation. After input power is restored, or a faulty PSU 110 is replaced, such that PSU 110 is again operable to provide electrical energy to information handling resources of information handling system 102, on the subsequent power-on of information handling system 102, data may be copied from the non-volatile memory 114 back to volatile memory 112 via a restore operation. The combined actions of data save and then data restore, allows the data to remain persistent through a power disruption. Accordingly, although not explicitly shown in FIG. 1, memory 104 may also include hardware, firmware, and/or software for carrying out save operations.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102. In some embodiments, BIOS 105 may also be configured to, alone or in concert with management controller 106, perform timing characterization for save operations in memory 104, as described in greater detail below.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110. For example, PSU 110 may communicate information regarding status and/or health of PSU 110 and/or measurements of electrical parameters (e.g., electrical currents or voltages) present within PSU 110. In some embodiments, management controller 106 may also be configured to, alone or in concert with BIOS 105, perform timing characterization for save operations in memory 104, as described in greater detail below.

Cache 108 may comprise a memory used by processor 103 to reduce the average time to access data from main memory 104. Cache 108 may be a smaller, faster memory than memory 104 and may store copies of frequently-used data and instructions from memory 104. In some embodiments, cache 108 may comprise an independent data cache and instruction cache. In these and other embodiments, a cache may be organized in a hierarchy of multiple cache levels (e.g., level 1, level 2, etc.). All or part of cache 108 may be configured as a write-back cache, in which processor 103 writes may be stored in cache 108 without also writing the data to memory 104, until a subsequent action such as cache line invalidate or flush operation forces the data to be written back to memory 104. Thus in write-back cache, the most up-to-date copy of the data may only reside in the cache indefinitely. Some part of cache 108 may also be configured as a write-through cache, in which processor 103 writes are stored in cache but also immediately to memory 104 such that the memory 104 has the most up-to-date copy of the data.

Generally speaking, PSU 110 may include any system, device, or apparatus configured to supply electrical current to one or more information handling resources of information handling system 102.

Energy storage device 116 may comprise any system, device, or apparatus configured to store energy which may be used by memory 104 to perform save operations in response to a loss of system input power source (e.g., alternating current input source) or power fault of PSU 110. In some embodiments, energy storage device 116 may comprise a battery configured to convert stored chemical energy into electrical energy. In other embodiments, energy storage device 116 may comprise a capacitor or "supercap" configured to store electrical energy and deliver such electrical energy to memory 104 when needed to perform save operations (e.g., by closure of a switch to electrically couple such capacitor to components of memory 104). Although energy storage device 116 is shown in FIG. 1 as external to memory 104, in some embodiments energy storage device 116 may be integral to memory 104. In these and other embodiments, energy storage device 116 may be charged from PSU 110. In some embodiments, energy storage device 116 may be communicatively coupled to management controller 106 via a systems management interface such as, for example, Inter-Integrated Circuit (i2C), System Management Bus (SMBus) or Power Management Bus (PMBus), allowing management controller 106 to receive health and status (e.g., state of charge) from and/or communicate commands to energy storage device 116. In some embodiments, energy storage device 116 may provide energy to a plurality of persistent memory 104 devices.

In addition to motherboard 101, processor 103, memory 104, BIOS 105, management controller 106, cache 108, energy storage device 116, and PSU 110, information handling system 102 may include one or more other information handling resources. For example, in some embodiments, information handling system 102 may include more than one PSU 110 and/or more than one energy storage device 116.

FIG. 2 illustrates a flow chart of an example method 200 for timing characterization of a persistent memory, in accordance with embodiments of the present disclosure According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, information handling system 102 may power on and BIOS 105 may begin power-on self-test. At step 204, BIOS 105 or management controller 106 may initialize memory 104. At step 206, BIOS 105 or management controller 106 may determine if a configuration for information handling system 102 has changed since the last energy characterization for a save operation to non-volatile memory 114. If the configuration for information handling system 102 has changed since the last energy characterization for a save operation to non-volatile memory 114, method 200 may proceed to step 210. Otherwise, if the configuration for information handling system 102 is unchanged since the last energy characterization for a save operation to non-volatile memory 114, method 200 may proceed to step 234.

At step 210, BIOS 105 and/or management controller 106 may initialize information handling resources of information handling system 102 to apply conditions that would impact timing for save operations in memory 104. At step 212, management controller 106 may emulate a power loss while leaving information handling system 102 powered on. At step 214, after the power loss exists for a period of time (e.g., after a ride-through time for PSU 110), management controller 106 may initiate a persistent memory save process for memory 104.

At step 216, management controller 106 may record a starting time $t_{start}$ of a save operation. At step 218, management controller 106 may cause execution of commands to undertake a save operation, including flushing all dirty cache lines and associated buffers to memory 104 followed by a save operation to transfer data from volatile memory 112 to non-volatile memory 114. In some embodiments, for example, to reduce wear on cells of non-volatile memory 114 or to prevent overwriting of recovery data already stored within non-volatile memory, the save operation may comprise a "virtual" save operation, whereby a save operation may be emulated by taking all steps necessary to accomplish a save operation other than the actual writing of data to cells of non-volatile memory 114. If completion time may vary when writing to non-volatile memory 114, memory 104 may provide timing acknowledgements that statistically correspond to the timing variations that would be observed when performing actual physical writes. In these and other embodiments, such "virtual" save operation may also include performing a save operation on a fraction of memory 104, and extrapolating energy required for a complete save operation for the entire memory capacity of memory 104 based on the save operation on the fraction of memory 104. As a specific example, one-fourth of memory 104 may be transferred from volatile memory 112 to non-volatile memory 114, and the overall energy needed to perform a save operation on all of memory 104 may be estimated as four times that needed to perform the save operation with respect to such one-fourth of memory 104.

At step 220, during such save operation, management controller 106 may measure the amount of power $P_{save}$ output by PSU 110. At step 222, upon completion of the save operation, management controller 106 may record an ending time $t_{end}$ for the save operation. At step 224, management controller 106 may calculate the energy required to perform a save operation, including flushing of dirty cache lines to volatile memory 112 before transfer of data from volatile memory 112 to non-volatile memory 114. For example, such energy $E_{save}$ may be given by $E_{save}=N \times P_{save} \times (t_{end}-t_{start})$, where N is a constant based on a fraction of the memory 104 on which the save operation was executed (e.g., N=1 save operation executed for entire memory 104, N=4 if save operation executed on one-fourth of cache lines flushed).

At step 226, management controller 106 may determine whether the energy $E_{save}$ is smaller than a hold-up energy $E_{hold-up}$ available from energy storage device 116. For example, where energy storage device 116 is a capacitor, the available hold-up time may be given by $E_{hold-up}=C(V_{max}^2-V_{min}^2)/2$ where C is a capacitance of energy storage device 116, $V_{max}$ equals a voltage of the energy storage device capacitor when fully charged, and $V_{min}$ equals the voltage of such capacitor at the end of the hold-up period when it is no longer able to provide energy (which, in some embodiments, may be equal to zero). If the available hold-up energy $E_{hold-up}$ exceeds the energy $E_{save}$ needed to perform the save operation, method 200 may proceed to step 234. Otherwise, if the energy $E_{save}$ exceeds the hold-up energy $E_{hold-up}$, method 200 may proceed to step 228.

At step 228, in response to a determination that the energy $E_{save}$ needed to perform the save operation exceeds available hold-up energy $E_{hold-up}$, management controller 106 may determine if information handling system 102 may be reconfigured to reduce the energy $E_{save}$ needed to perform save operations. Reconfiguration may include modifications to reduce cache flush times, including without limitation modification of write-back cache size, modification of allowable memory modes (e.g., allowable error correction code modes), reduced throttling levels of information handling resources of information handling system 102, and/or other reconfigurations. Reconfiguration may also include modifications to reduce transfer times of data from volatile memory 112 to non-volatile memory 114, including without limitation a limit of a portion of memory 104 supporting persistent memory capability, allowable error correction code modes, allowable encryption modes, and/or other modifications. If information handling system 102 may be reconfigured to reduce the energy $E_{save}$ needed to perform save operations, method 200 may proceed to step 232. Otherwise, method 200 may proceed to step 230.

At step 230, in response to a determination that information handling system 102 may not be reconfigured to reduce the energy $E_{save}$ needed to perform save operations, management controller 106 may provide an alert to a user of information handling system 102 that information handling system 102 will not support persistent memory capabilities of memory 104. After completion of step 230, method 200 may proceed to step 234.

At step 232, in response to a determination that information handling system 102 may be reconfigured to reduce the energy $E_{save}$ needed to perform save operations, management controller 106 may, alone or in conjunction with BIOS 105, reconfigure information handling system 102 to reduce the energy $E_{save}$ needed to perform save operations. After completion of step 232, method 200 may proceed again to step 210.

At step 234, information handling system 102 may finish booting and continue normal operation. In the event of a power event, power management components (e.g., management controller 106, PSU 110) of information handling system 102 may perform save operations in accordance with the most-recent non-volatile memory timing characterization operation. After completion of step 234, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
    a processor;
    a management controller communicatively coupled to the processor and configured to, during boot of the information handling system:
        determine a first amount of energy required by the information handling system to perform a save operation to transfer data from a volatile memory to a non-volatile memory of a persistent memory in response to a loss of power for supplying electrical energy to the information handling system, wherein determining the first amount of energy comprises:
            emulating the loss of power; and
            during emulation of the loss of power:
                emulating the save operation to measure a time required to complete the save operation, wherein emulating the save operation includes taking at least a portion of steps necessary to accomplish the save operation to at least a portion of the non-volatile memory;
                measuring an amount of power delivered by the one or more power supplies during emulation of the save operation; and
                calculating the first amount of energy based on the time and the amount of power;
        determine whether a second amount of energy available for providing electrical energy for the save operation in response to the loss of power exceeds the first amount of energy; and
        responsive to determining whether the second amount of energy exceeds the first amount of energy, determine whether to support the persistent memory.

2. The information handling system of claim 1, wherein the first amount of energy comprises at least an amount of energy required to transfer data from the volatile memory to the persistent memory.

3. The information handling system of claim 1, wherein determining whether to support the persistent memory comprises enabling the persistent memory responsive to determining the second amount of energy exceeds the first amount of energy.

4. The information handling system of claim 1, wherein determining whether to support the persistent memory comprises disabling the persistent memory responsive to determining the first amount of energy exceeds the second amount of energy.

5. The information handling system of claim 1, wherein the management controller is further configured to, responsive to determining the first amount of energy exceeds the second amount of energy:
    reconfigure the information handling system to a new configuration to reduce energy needed to perform save operations;
    re-determine the first amount of energy under the new configuration;
    determine whether the second amount of energy exceeds the first amount of energy under the new configuration; and
    responsive to determining whether the second amount of energy exceeds the first amount of energy under the new configuration, determine whether to support the persistent memory.

6. A method comprising, during boot of an information handling system:
    determining a first amount of energy required by the information handling system to perform a save operation to transfer data from a volatile memory to a non-volatile memory of a persistent memory in response to a loss of power of one or more power supplies for supplying electrical energy to the information handling system, wherein determining the first amount of energy comprises:
        emulating the loss of power; and
        during emulation of the loss of power:
            emulating the save operation to measure a time required to complete the save operation, wherein emulating the save operation includes taking at least a portion of steps necessary to accomplish the save operation to at least a portion of the non-volatile memory;
            measuring an amount of power delivered by the one or more power supplies during emulation of the save operation; and
            calculating the first amount of energy based on the time and the amount of power;
    determining whether a second amount of energy available for providing electrical energy for the save operation in response to the loss of power exceeds the first amount of energy; and
    responsive to determining whether the second amount of energy exceeds the first amount of energy, determining whether to support the persistent memory.

7. The method of claim 6, wherein the first amount of energy comprises at least an amount of energy required to transfer data from the volatile memory to the persistent memory.

8. The method of claim 6, wherein determining whether to support the persistent memory comprises enabling the persistent memory responsive to determining the second amount of energy exceeds the first amount of energy.

9. The method of claim 6, wherein determining whether to support the persistent memory comprises disabling the persistent memory responsive to determining the first amount of energy exceeds the second amount of energy.

10. The method of claim 6, further comprising, responsive to determining the first amount of energy exceeds the second amount of energy:
    reconfiguring the information handling system to a new configuration to reduce energy needed to perform save operations;
    re-determining the first amount of energy under the new configuration;
    determining whether the second amount of energy exceeds the first amount of energy under the new configuration; and
    responsive to determining whether the second amount of energy exceeds the first amount of energy under the new configuration, determining whether to support the persistent memory.

11. An article of manufacture comprising:
    a non-transitory computer-readable medium; and computer-executable instructions carried on the computer-readable medium, the instructions readable by a processor, the instructions, when read and executed, for causing the processor to, during boot of an information handling system:
    determine a first amount of energy required by the information handling system to perform a save operation to transfer data from a volatile memory to a non-volatile memory of a persistent memory in response to a loss of power of one or more power supplies for supplying electrical energy to the information handling system, wherein determining the first amount of energy comprises:
        emulating the loss of power; and
        during emulation of the loss of power:
            emulating the save operation to measure a time required to complete the save operation, wherein emulating the save operation includes taking at least a portion of steps necessary to accomplish the save operation to at least a portion of the non-volatile memory;
            measuring an amount of power delivered by the one or more power supplies during emulation of the save operation; and
    calculating the first amount of energy based on the time and the amount of power;
    determine whether a second amount of energy available for providing electrical energy for the save operation in response to the loss of power exceeds the first amount of energy; and
    responsive to determining whether the second amount of energy exceeds the first amount of energy, determine whether to support the persistent memory.

12. The article of claim 11, wherein the first amount of energy comprises at least an amount of energy required to transfer data from the volatile memory to the persistent memory.

13. The article of claim 11, wherein determining whether to support the persistent memory comprises enabling the persistent memory responsive to determining the second amount of energy exceeds the first amount of energy.

14. The article of claim 11, wherein determining whether to support the persistent memory comprises disabling the persistent memory responsive to determining the first amount of energy exceeds the second amount of energy.

15. The article of claim 11, the instructions for further causing the processor to, responsive to determining the first amount of energy exceeds the second amount of energy:
    reconfigure the information handling system to a new configuration to reduce energy needed to perform save operations;
    re-determine the first amount of energy under the new configuration;
    determine whether the second amount of energy exceeds the first amount of energy under the new configuration; and
    responsive to determining whether the second amount of energy exceeds the first amount of energy under the new configuration, determine whether to support the persistent memory.

* * * * *